United States Patent
Dietl et al.

(10) Patent No.: US 11,987,108 B2
(45) Date of Patent: May 21, 2024

(54) ROLLER BLIND ARRANGEMENT COMPRISING GUIDE STRIPS FOR A ROLLER BLIND WEB

(71) Applicant: Webasto SE, Stockdorf (DE)

(72) Inventors: Rudolf Dietl, Stockdorf (DE); Andreas Steinberger, Stockdorf (DE); Erwin Steiner, Stockdorf (DE); Patrick Joswig, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 326 days.

(21) Appl. No.: 16/633,962

(22) PCT Filed: Jun. 27, 2018

(86) PCT No.: PCT/EP2018/067293
§ 371 (c)(1),
(2) Date: Jan. 24, 2020

(87) PCT Pub. No.: WO2019/025085
PCT Pub. Date: Feb. 7, 2019

(65) Prior Publication Data
US 2020/0207193 A1    Jul. 2, 2020

(30) Foreign Application Priority Data

Aug. 3, 2017  (DE) .................... 10 2017 117 632.2
Jan. 24, 2018 (DE) .................... 10 2018 101 557.7

(51) Int. Cl.
*B60J 7/043*    (2006.01)
*B60J 1/20*     (2006.01)
(Continued)

(52) U.S. Cl.
CPC ........... *B60J 7/0015* (2013.01); *B60J 1/2052* (2013.01); *B60J 1/2041* (2013.01); *B60J 7/043* (2013.01); *E06B 9/42* (2013.01); *E06B 9/58* (2013.01)

(58) Field of Classification Search
CPC ..... E06B 9/42; E06B 9/58; B60J 7/043; B60J 7/0015; B60J 1/2052; B60J 1/2041;
(Continued)

(56) References Cited

U.S. PATENT DOCUMENTS 8,474,510 B2 *  7/2013  Nellen .................... B60J 7/0015
                                                   160/370.22
8,857,903 B2 * 10/2014  Nellen .................... B60J 7/024
                                                   296/220.01
(Continued)

FOREIGN PATENT DOCUMENTS

DE         197 39 919 A1    3/1999
DE    20 2007 001 909 U1    5/2007
(Continued)

OTHER PUBLICATIONS

International Preliminary Report on Patentability for PCT/EP2018/067293 issued Feb. 4, 2020 (7 pages).
(Continued)

*Primary Examiner* — Abe Massad
*Assistant Examiner* — Matthew R. Shepherd
(74) *Attorney, Agent, or Firm* — Fitch, Even, Tabin & Flannery, LLP

(57) ABSTRACT

A vehicle roof roller blind arrangement having roller blind web, windable to form a roller blind fabric roll in a winding area, and two guide rails disposed on either side of the web and which have respective guide tracks in which lateral guide strips of the web are guided, the guide rails connected to each other via a transverse frame part in which the
(Continued)

winding area for the roller blind web is formed. Each guide rail has a clean-cut end adjacent to the transverse frame part. The transverse frame part has a strip infeed element for each guide rail, the strip infeed elements forming infeed tracks for the guide strips, each infeed track being defined by at least one inner retaining rib and at least one outer retaining rib for the guide strip, and the infeed tracks ending in the guide tracks of the guide rails.

7 Claims, 9 Drawing Sheets

(51) Int. Cl.
  *B60J 7/00* (2006.01)
  *E06B 9/42* (2006.01)
  *E06B 9/58* (2006.01)
(58) Field of Classification Search
  CPC ...... B60J 1/2011; B60J 1/2013; B60J 1/2063; B60J 1/2038
  See application file for complete search history.

(56) References Cited

U.S. PATENT DOCUMENTS

| | | | |
|---|---|---|---|
| 2010/0170645 A1* | 7/2010 | Lin | B60J 7/0015 160/370 |
| 2011/0146921 A1 | 6/2011 | Nellen et al. | |
| 2011/0226426 A1 | 9/2011 | Zendath | |
| 2011/0227371 A1* | 9/2011 | Nellen | B60J 7/0015 160/368.1 |
| 2012/0098301 A1* | 4/2012 | Nakamura | B60J 7/0015 296/219 |
| 2012/0248827 A1* | 10/2012 | Weyl | B60J 7/0084 296/216.07 |
| 2014/0041814 A1* | 2/2014 | Roberts | A47H 5/03 160/271 |
| 2014/0048218 A1* | 2/2014 | Ng | E06B 9/42 160/293.1 |
| 2014/0262084 A1* | 9/2014 | Fleischman | E06B 9/40 160/368.1 |
| 2015/0361918 A1* | 12/2015 | Park | F02D 41/20 123/490 |
| 2016/0114664 A1* | 4/2016 | Yukisada | B60J 7/0015 296/98 |
| 2016/0221424 A1* | 8/2016 | Van Boxtel | B60J 7/067 |
| 2017/0087966 A1 | 3/2017 | Umeki | |

FOREIGN PATENT DOCUMENTS

| | | | | |
|---|---|---|---|---|
| DE | 202007001909 U1 * | 5/2007 | | B60J 7/0015 |
| DE | 10 2006 003 983 A1 | 8/2007 | | |
| DE | 10 2007 002 857 A1 | 7/2008 | | |
| DE | 10 2007 041 298 A1 | 3/2009 | | |
| DE | 10 2010 054 590 B3 | 3/2012 | | |
| DE | 10 2012 201 256 A1 | 8/2012 | | |
| DE | 10 2011113 207 A1 | 3/2013 | | |
| EP | 2 580 077 B1 | 4/2013 | | |
| EP | 2 447 098 B1 | 9/2017 | | |
| WO | 2014/191283 A2 | 12/2014 | | |

OTHER PUBLICATIONS

International Search Report for PCT/EP2018/067293 mailed Oct. 15, 2018 enclosed herewith (5 pages).

* cited by examiner

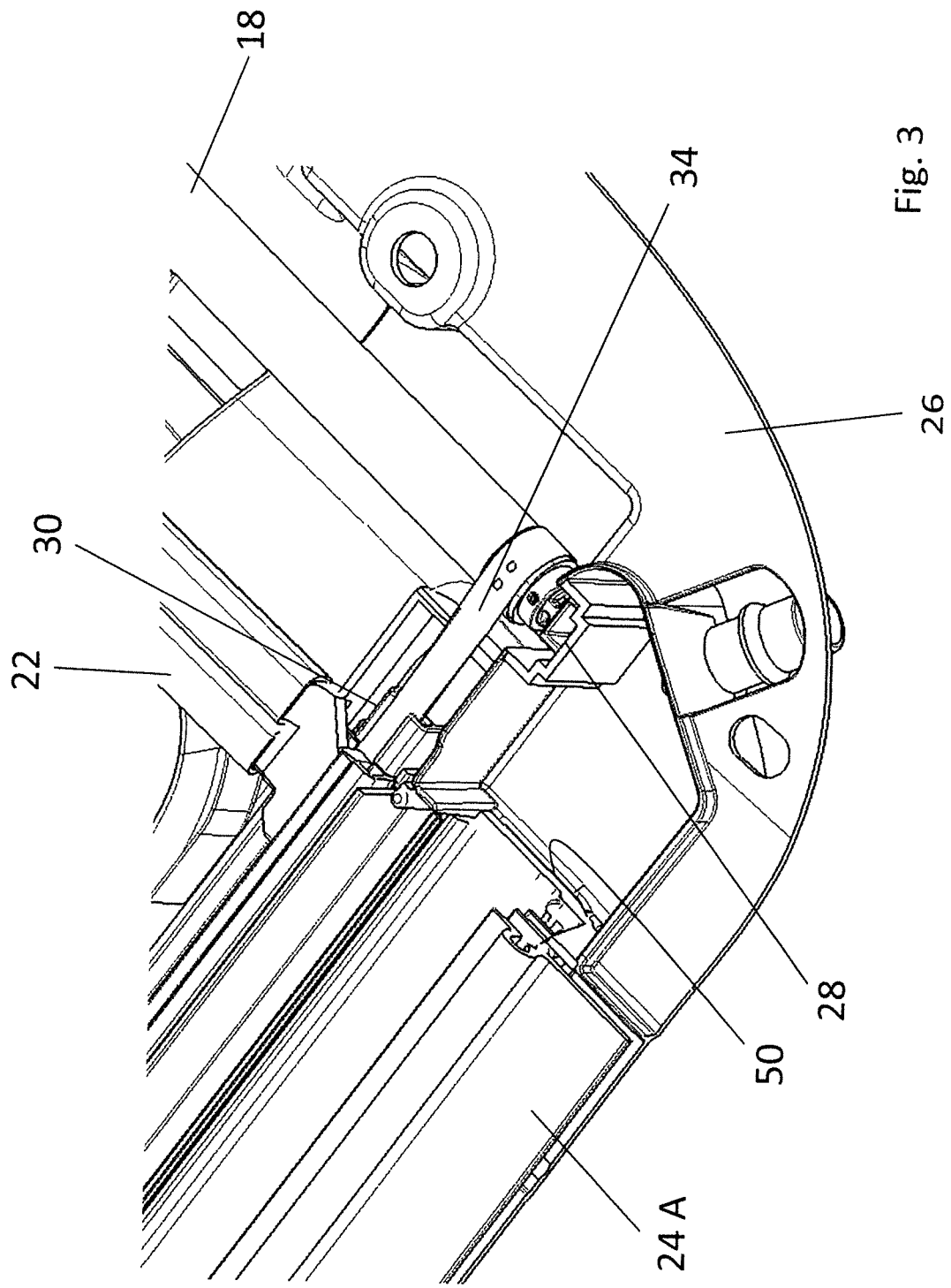

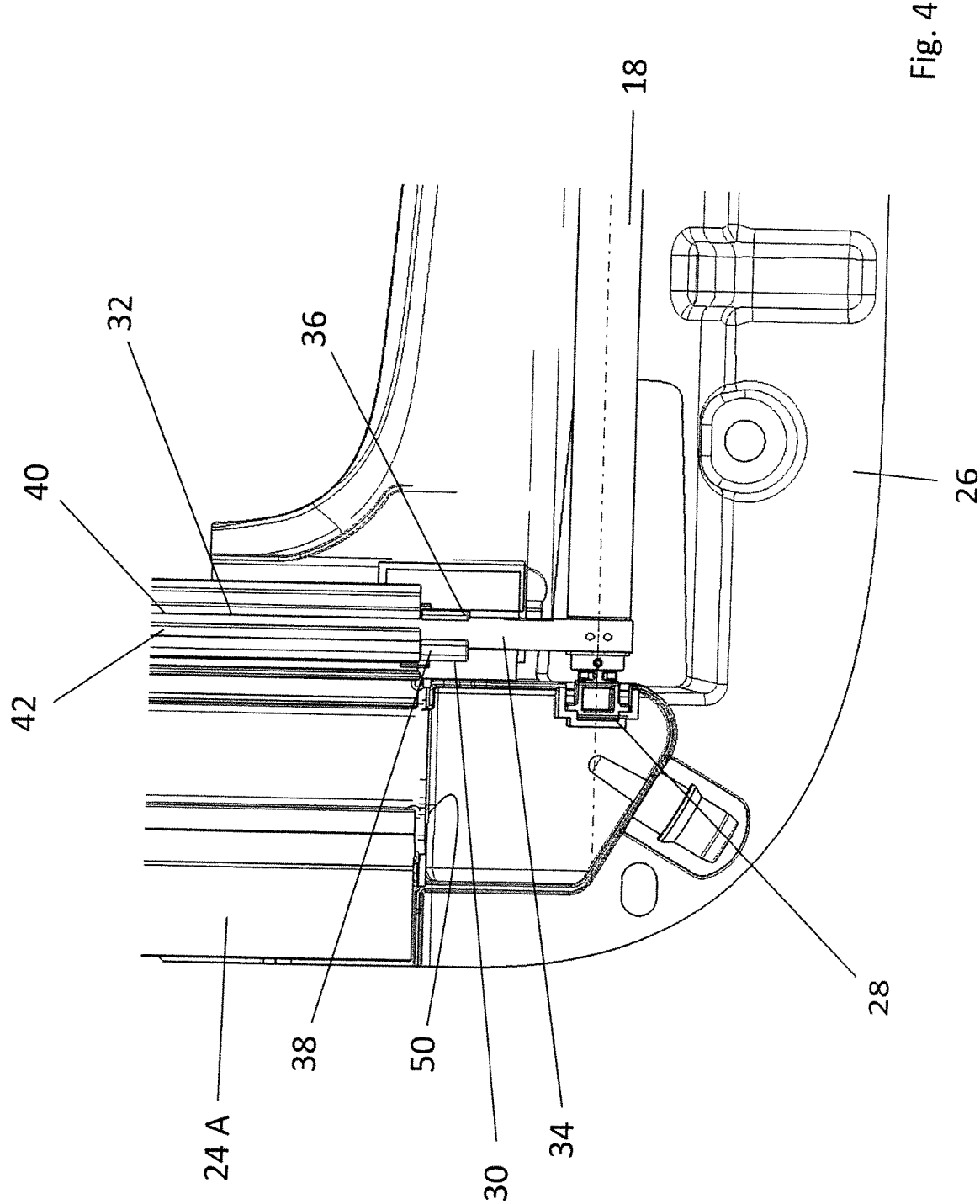

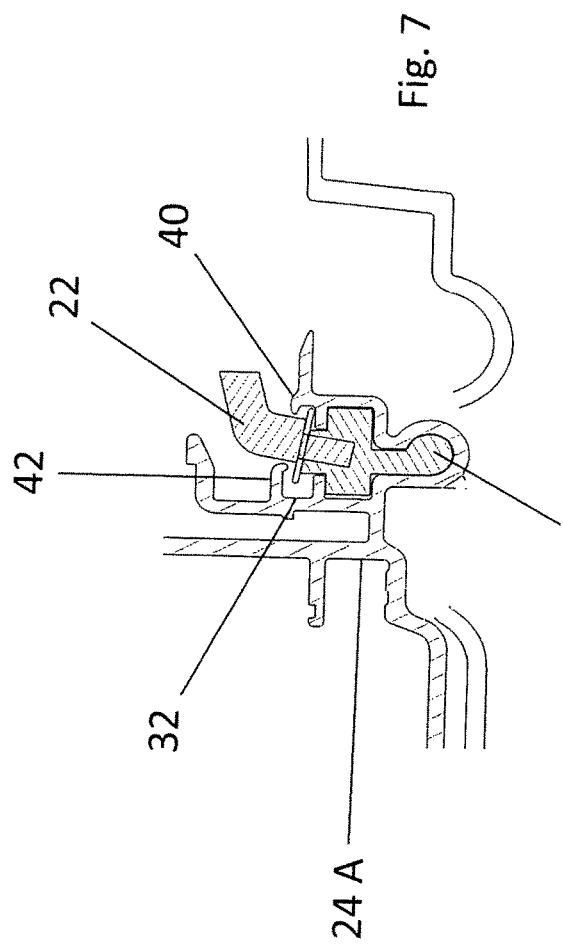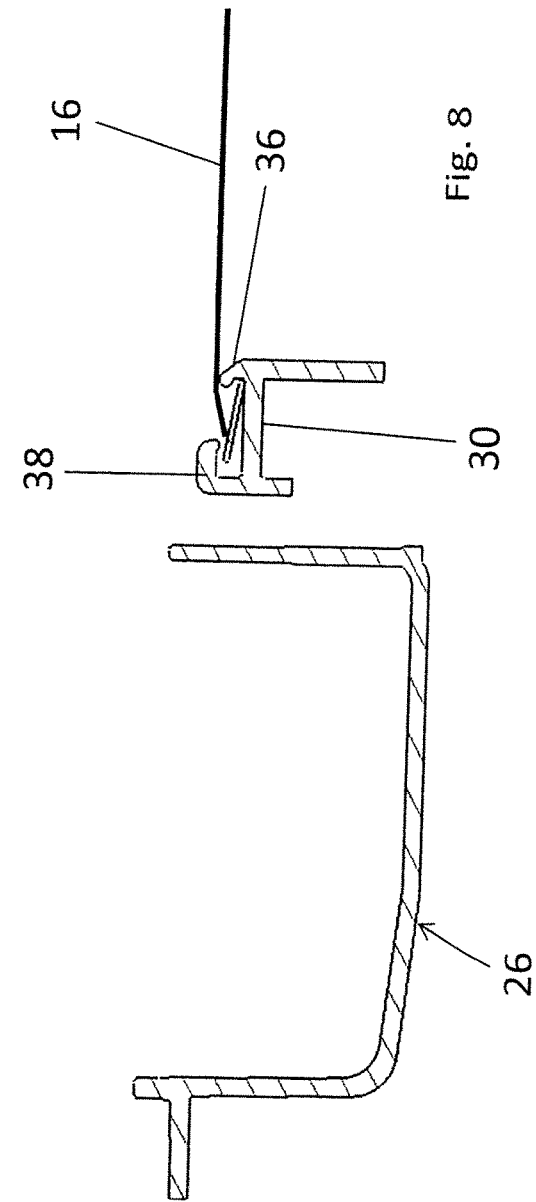

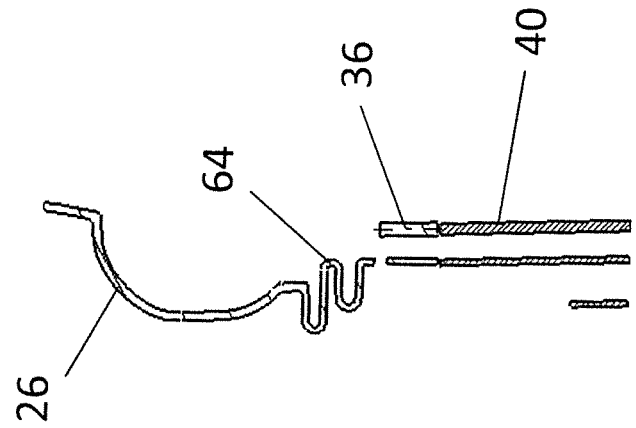
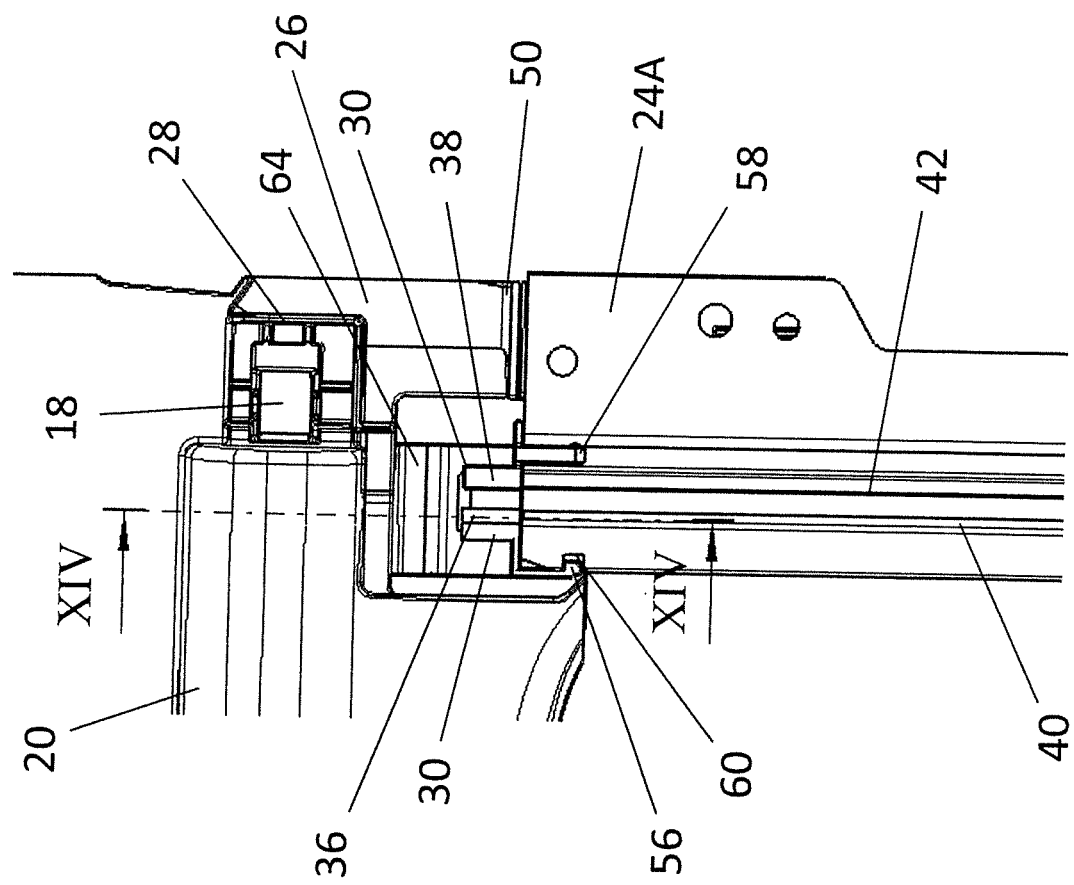

ROLLER BLIND ARRANGEMENT COMPRISING GUIDE STRIPS FOR A ROLLER BLIND WEB

CROSS-REFERENCE TO RELATED APPLICATIONS

This application is a U.S. national phase application filed under 35 U.S.C. § 371 of International Application No. PCT/EP2018/067293, filed Jun. 27, 2018, designating the United States, which claims priority from German Patent Application No. 10 2017 117 632.2, filed on Aug. 3, 2017 and German Patent Application No. 10 2018 101 557.7, filed on Jan. 24, 2018 which are hereby incorporated herein by reference in their entirety for all purposes.

FIELD

The invention relates to a roller blind arrangement of a motor vehicle, in particular of a vehicle roof, the roller blind arrangement having the features of the preamble of claim 1.

BACKGROUND

A roller blind arrangement of this kind is known from practice and constitutes a laterally guided roller blind which can be used as a shading arrangement of a vehicle roof that has at least one transparent roof element, in particular a transparent sunroof lid. The known roller blind arrangement comprises a roller blind web which is made of a reelable flexible material and which can be wound up to form a roller blind fabric roll at a rear edge of a roof opening, which can be closed by means of the transparent lid element. In order to be able to guide the roller blind web at its lateral edges, the roller blind arrangement comprises two guide rails, each of which has a guide track in which a lateral guide strip of the roller blind web is guided. The two guide rails are part of a frame and are connected to each other via a transverse frame part on which the roller blind fabric roll foul's when the roller blind is wound up. The two guide rails are typically formed by extruded aluminum profiles, whereas the transverse frame part may be an injection-molded plastic part. When the roller blind web has been unwound from its roller blind fabric roll in order to shade the transparent roof portion, the guide strips enter the associated guide tracks of the guide rails. When the roller blind web is wound up to form the roller blind fabric roll, the roller blind web edges formed by the guide strips exit the guide tracks of the guide rails. At the top, the guide tracks are delimited by guide ribs which retain the guide strips in the guide tracks. Moreover, the roller blind web is centered in the transverse direction of the roller blind by the guide strips being retained in the guide tracks.

SUMMARY

The object of the invention is to provide a roller blind arrangement of the kind mentioned above in which the roller blind web is centered before the guide strips even enter the guide tracks of the guide rails.

According to the invention, this object is attained by the roller blind arrangement having the features of claim 1.

So the present invention proposes, on the one hand, for the guide rails to each have a clean-cut end adjacent to the transverse frame part, which enables simple and cost-effective production of the guide rails, which are made of extruded profiles, and, on the other hand, for the transverse frame part, which is connected to the guide rails, to have a strip infeed element for each guide rail, the strip infeed element forming an infeed track for the associated guide strip, the infeed track being defined by at least one inner retaining rib, which is disposed closer to the longitudinal center plane, and at least one outer retaining rib, which is disposed further away from the longitudinal center plane, the retaining ribs serving to retain the guide strip, and the infeed tracks ending in the guide tracks of the guide rails. Thus, a geometry for a roller blind web guide or fabric guide which allows the roller blind web to be integrated into the transverse frame part during installation of the roller blind arrangement before the transverse frame part is connected to the guide rails is integrated in the transverse frame part. In this case, the guide rails can be connected to the transverse frame part parallel to their length, i.e., typically in the longitudinal direction of a vehicle when a vehicle roof is concerned. An installation direction perpendicular to the length of the guide rails is not required. This facilitates installation of the roller blind arrangement.

In a preferred embodiment of the roller blind arrangement according to the invention, the strip infeed elements are connected to a body of the transverse frame part via respective support walls.

In an advantageous embodiment of the roller blind arrangement according to the invention, the support walls are deformable, in particular elastically. By deformation of the support walls, tolerances between the strip infeed elements and the guide rails can be compensated.

In a preferred embodiment, the support walls have a sinuous cross-section in the longitudinal direction of the guide rails, said cross-section allowing tolerances between the strip infeed elements and the guide rails to be compensated in the longitudinal direction and in the vertical direction of the guide rails in particular.

The support walls have a maximum wall thickness of about 4 mm, for example, the selection of a suitable plastic thus ensuring elastic deformability of the support walls at all times.

In a preferred embodiment of the roller blind arrangement according to the invention, the strip infeed elements each have at least one locking element which engages into the associated guide rail in order to clearly define the position of the strip infeed elements on the guide rails. For example, the locking element is a tab-like protrusion which is in contact with a wall or a web of the associated guide rail.

The locking element may be a pin, for example, and a recess corresponding to the pin may be formed on each guide rail. This allows the strip infeed elements and the guide rails to be precisely positioned relative to each other.

In an alternative embodiment, the locking element may be a catch element. In that case, a corresponding mating catch element for the catch element may be formed on each of guide rail. The mating catch element is a catch lug and/or a catch recess, for example.

In this way, installation does not require any additional components for fixing the guide rails to the strip infeed elements. Moreover, catching of the catch elements on the mating catch elements provides a mechanic with immediate feedback as to whether the guide rails are correctly fixed to the strip infeed elements.

In order to seal areas of transition between the guide rails and the transverse frame part, which is located in the wet area of the vehicle in question, sealing elements are disposed between the clean-cut ends of the guide rails and the transverse frame part in an advantageous embodiment of the roller blind arrangement according to the invention. The sealing elements may be butyl seals which seal the areas of the arrangement that will come into contact with water.

The transverse frame part of the roller blind arrangement is preferably an injection-molded plastic part made of glass-fiber-reinforced plastic. The strip infeed element is preferably formed in one piece with the injection-molded plastic part.

The guide rails of the roller blind arrangement according to the invention are advantageously formed by extruded aluminum profiles. Before they are connected to the transverse frame part, the extruded aluminum profiles simply need to be cleanly cut to length.

Other advantages and advantageous features of the subject-matter of the invention are apparent from the description, the drawing and the claims.

Two embodiments of a roller blind arrangement according to the invention are illustrated in a schematically simplified manner in the drawing and will be explained in more detail in the following description.

BRIEF DESCRIPTIONS OF THE DRAWINGS

FIG. 3 is a view of the first embodiment of the roller blind arrangement according to FIG. 2 without illustration of a roller blind web;

FIG. 4 is a plan view of the area of the first embodiment of the roller blind arrangement shown in FIG. 3;

FIG. 7 is a section through the first embodiment of the roller blind arrangement along line VII-VII in FIG. 2;

FIG. 8 is a section through the first embodiment of the roller blind arrangement along line VIII-VIII in FIG. 2;

FIG. 13 is a plan view of the area of the second embodiment of the roller blind arrangement illustrated in FIG. 9 shown in the installed state;

FIG. 14 is a section through the second embodiment of the roller blind arrangement in the installed state along line XIV-XIV in FIG. 13.

DETAILED DESCRIPTION

Figure 1:
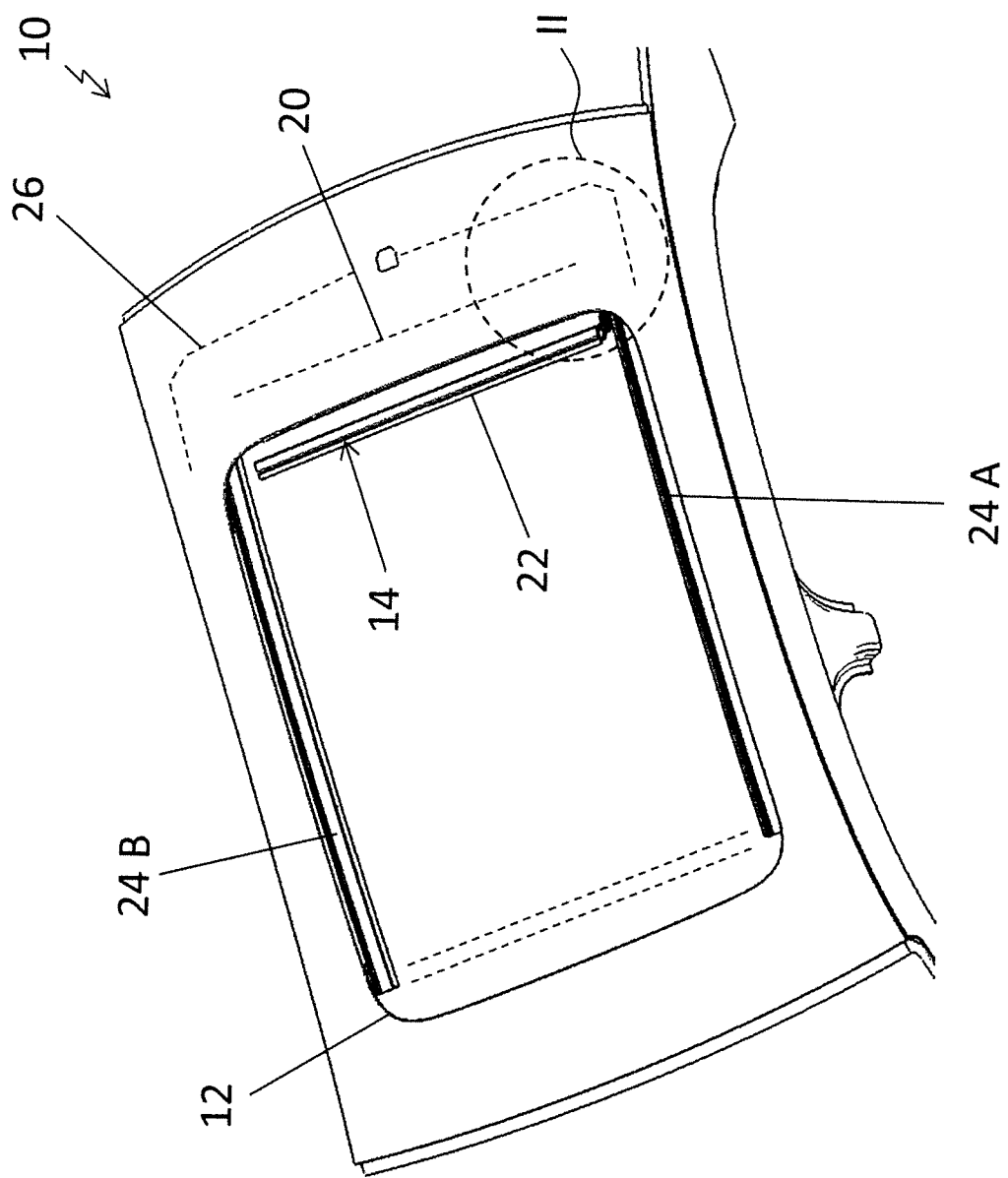
FIG. 1 is a perspective view of a vehicle roof having a roller blind arrangement according to the invention.

FIG. 1 shows a vehicle roof 10 of a passenger motor vehicle not illustrated in more detail otherwise, vehicle roof 10 having a roof cutout 12 which can be closed or at least partially opened by means of a transparent lid element (not shown).

In order to be able to protect a vehicle interior of the passenger motor vehicle against light shining through the roof cutout and the transparent lid element, vehicle roof 10 has a shading arrangement which is realized as a roller blind arrangement 14, a first embodiment of which is illustrated in FIGS. 1 to 8. Roller blind arrangement 14 forms a laterally guided roller blind comprising a roller blind web 16 which can be wound onto a winding shaft 18 to form a roller blind fabric roll 20 in the area of a rear edge of roof cutout 12. At its edge facing away from roller blind fabric roll 20, said edge extending in the transverse direction of roof 10, roller blind web 16 is provided with a pull bar 22, which serves as an operating element of roller blind web 16.

To laterally guide roller blind web 16, roller blind arrangement 14 has guide rails 24A and 24B on either side of a vertical longitudinal center plane of roof 10, guide rails 24A and 24B extending along the lateral edges of roof cutout 12. Guide rails 24A and 24B are made of an aluminum material and are extruded profiles. Pull bar 22 is guided in in guide rails 24A and 24B via sliders 23.

Furthermore, roller blind arrangement 14 comprises a transverse frame part 26 which extends in the transverse direction of roof 10 along the rear edge of roof cutout 12 and which connects bilaterally disposed guide rails 24A and 24B. Guide rails 24A and 24B thus form a U-shaped roof frame together with transverse frame part 26. Transverse frame part 26 is an injection-molded plastic part made of glass-fiber-reinforced plastic.

Roller blind arrangement 14 is substantially mirror-symmetrical with respect to a vertical longitudinal center plane of roof 10, which is why the following description will substantially be limited to the portions of the roller blind arrangement that are disposed on the left with respect to the forward direction of travel of the passenger motor vehicle. The portions of the roller blind arrangement disposed on the right with respect to the forward direction of travel of the passenger motor vehicle are realized correspondingly and are analogously apparent from the description.

Figure 2:
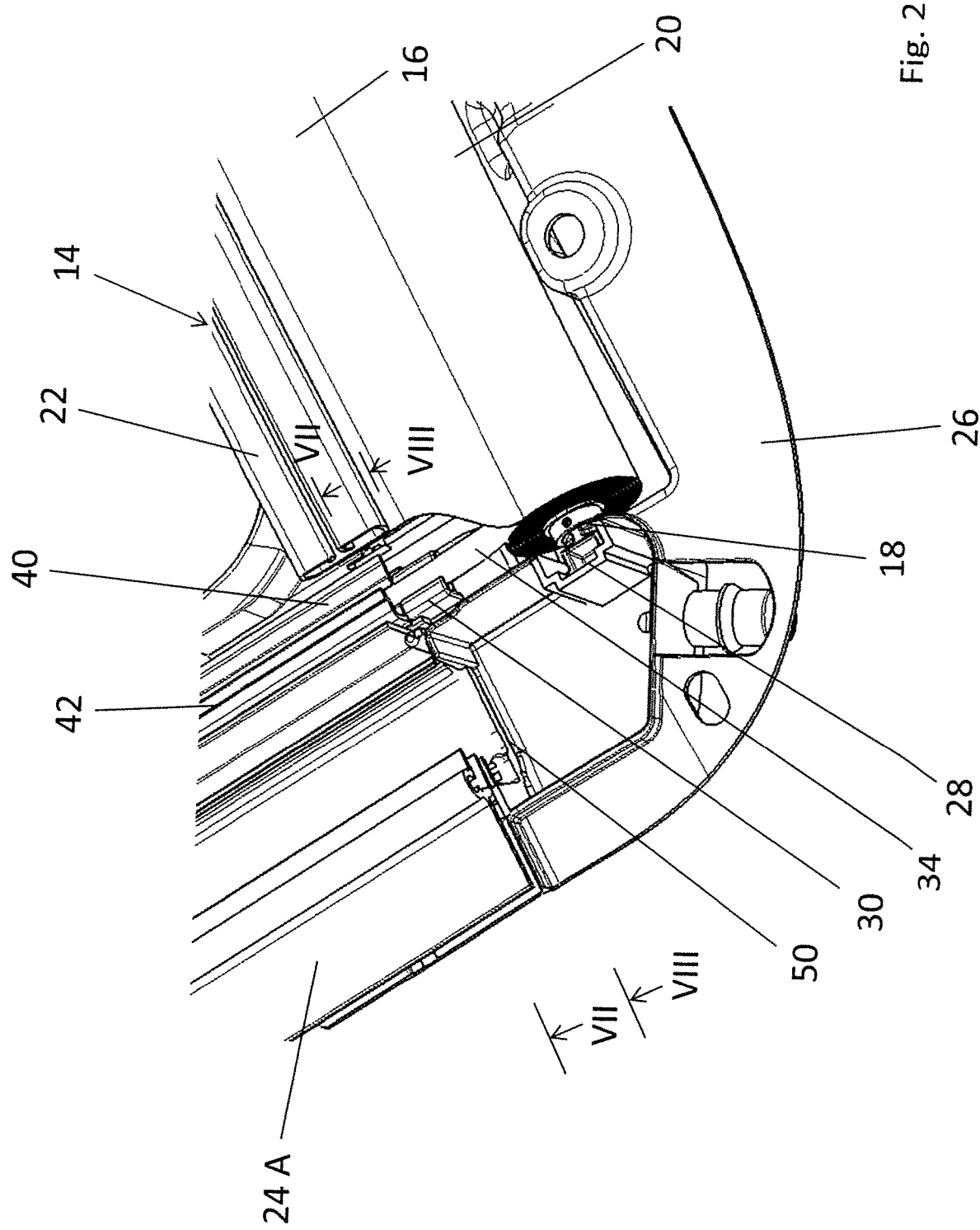
FIG. 2 is an enlarged view of the first embodiment of the roller blind arrangement in an area II in FIG. 1.

In the first embodiment, which is illustrated in FIGS. 2 to 8, transverse frame part 26 has bearing seats 28 for the winding shaft 18 on both sides. Moreover, transverse frame part 26 has strip infeed elements 30 adjacent to respective guide rails 24A and 24B, each strip infeed element 30 being adjacent to the respective ends of guide rails 24A and 24B that face transverse frame part 26. Strip infeed elements 30 end in respective guide tracks 32 of guide rails 24A and 24B. Strip infeed elements 30 and guide tracks 32 of guide rails 24A and 24B serve to guide respective guide strips 34, which are made of metal or plastic and by means of which roller blind web 16 is guided at its lateral edges on either side of the vertical longitudinal center plane of roof 10, whereby it is held under tension in the transverse direction of roof 10. Guide strips 34 are attached to the lateral edges of roller blind web 16. In FIG. 2, roller blind web 16 and pull bar 22 are lifted off guide strip 34 between guide rail 24A and roller blind fabric roll 20 for a clearer view. Strip infeed elements 30 guide and center roller blind web 16 even in the area of transverse frame part 26.

Figure 6:
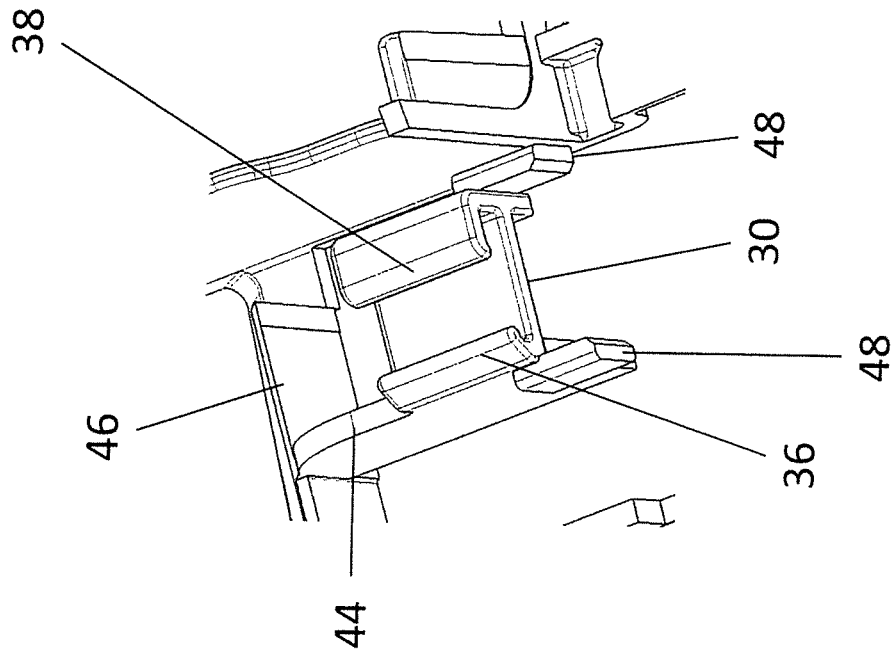
FIG. 6 is a perspective illustration of the strip infeed element of the first embodiment of the roller blind arrangement.
Figure 5:
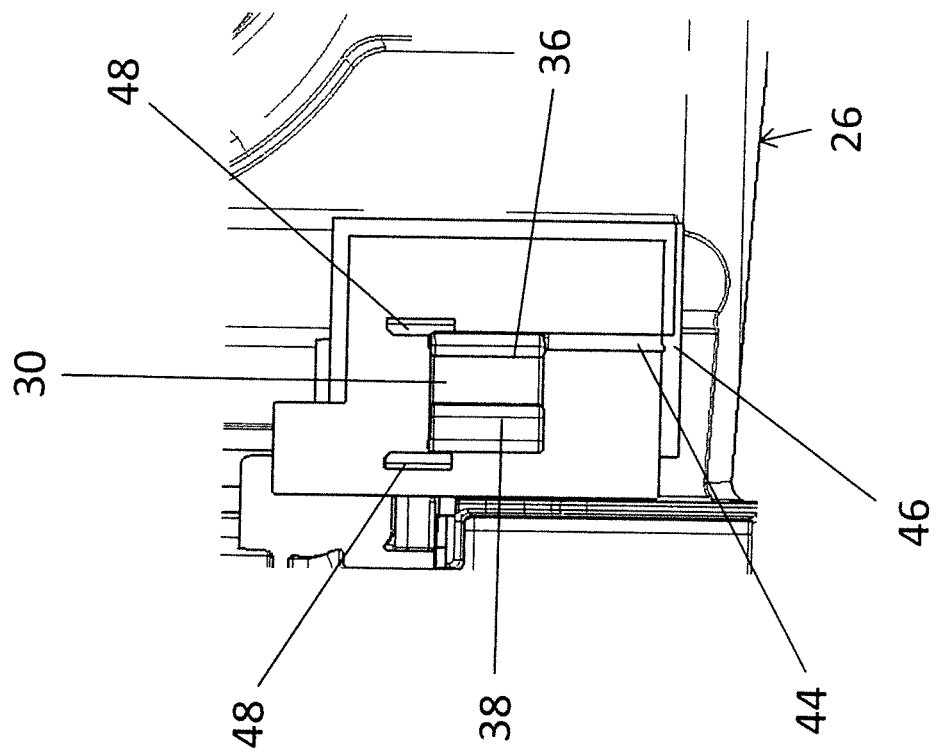
FIG. 5 is a plan view of a transverse frame part of the first embodiment of the roller blind arrangement in the area of a strip infeed element.
Figure 10:
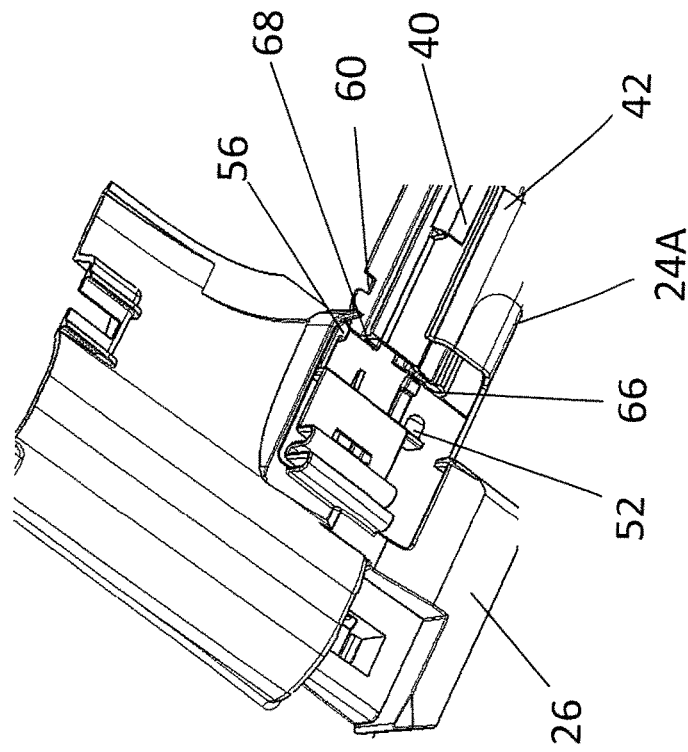
FIG. 10 is a perspective bottom view of the area of the second embodiment of the roller blind arrangement illustrated in FIG. 9 shown in the pre-installation state.
Figure 9:
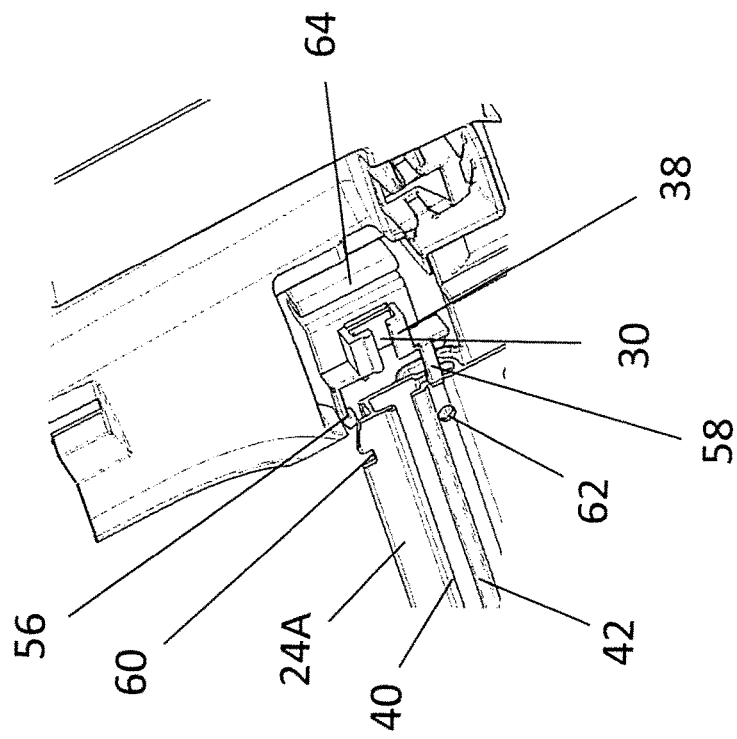
FIG. 9 is an enlarged view of a second embodiment of a roller blind arrangement in an area II in FIG. 1 shown in a pre-installation state.
Figure 12:
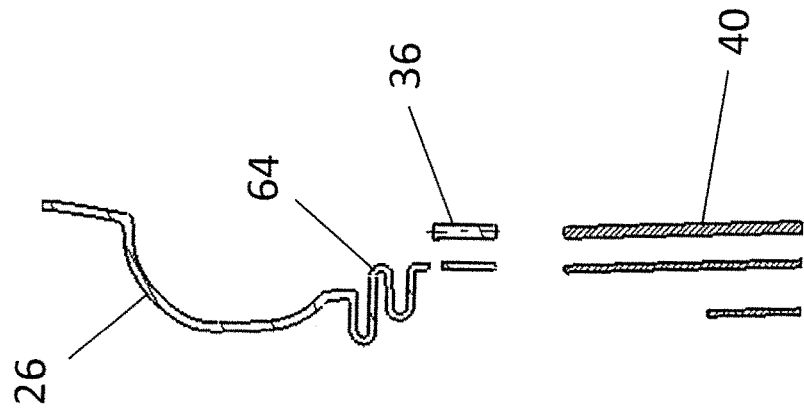
FIG. 12 is a section through the second embodiment of the roller blind arrangement along line XII-XII in FIG. 11.

As can be seen in FIGS. 5 and 6 in particular, strip infeed elements 30 each have an inner retaining rib 36, which is disposed closer to the vertical longitudinal center plane of roof 10, and an outer retaining rib 38, which is disposed further away from the vertical longitudinal center plane of roof 10, retaining ribs 36 and 38 retaining guide strip 34 in strip infeed element 30 and being adjacent to corresponding guide ribs 40 and 42 of guide track 32 of respective guide rails 24A and 24B.

In order to be able to compensate for tolerances between strip infeed elements 30 and associated guide tracks 32 of guide rails 24A and 24B during installation of guide rails 24A and 24B, each strip infeed element 30 is connected to a body 46 of transverse frame part 26 via a support wall 44. Support walls 44 have a wall thickness of 2 mm to 4 mm and allow respective strip infeed elements 30 to shift in the transverse direction of roof 10.

To connect strip infeed elements 30 to guide rails 24A and 24B at a precise position, two tab-like protrusions 48, which each form a locking element, are formed at the end of each strip infeed element 30, tab-like protrusions 48 being in contact with a wall or rib of respective guide rails 24A and 24B when in the installed position and securing strip infeed elements 30 against shifting in the transverse direction of roof 10.

Body 46 and strip infeed elements 30 with support walls 44 are realized in one piece as an injection-molded plastic part and consist of glass-fiber-reinforced plastic.

Roller blind web 16, guide tracks 32 and strip infeed elements 30 of roller blind arrangement 14 are located in a dry area of the roof frame. To prevent water from intruding into the vehicle body in an area of transition located in a wet area of the roof frame between guide rails 24A and 24B on one side and transverse frame part 26 on the other side, sealing elements 50, which are formed by butyl seals, are disposed adjacent to the clean-cut ends or end faces of guide rails 24A and 24B.

Figure 11:
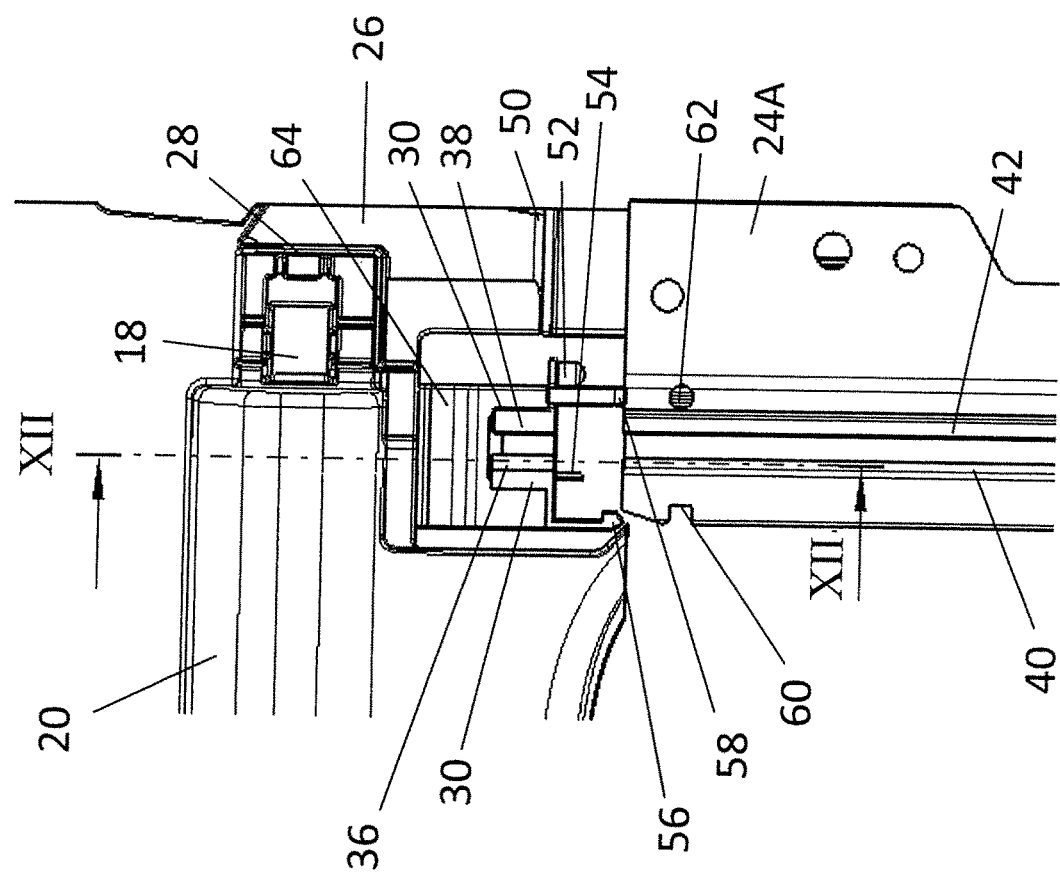
FIG. 11 is a plan view of the area of the second embodiment of the roller blind arrangement illustrated in FIG. 9 shown in the pre-installation state.

FIGS. 9 to 12 show a second embodiment of a roller blind arrangement according to the invention, which is also part of a vehicle roof of the kind illustrated in FIG. 1. As can be seen in FIG. 11 in particular, this roller blind arrangement comprises a transverse frame part 26 which has bearing seats 28 for a winding shaft 18 on both sides. Respective strip infeed elements 30 are disposed adjacent to guide rails 24A and 24B.

Strip infeed elements 30, which are part of transverse frame part 26, end in respective guide tracks 32 of guide rails 24A and 24B. Strip infeed elements 30 and guide tracks 32 of guide rails 24A and 24B serve to guide a guide strip 34, which may be made of metal or plastic. Guide strips 34 are attached to the lateral edges of roller blind web 16, thus guiding roller blind web 16 at its lateral edges on either side of the vertical longitudinal center plane of roof 10, whereby roller blind web 16 is pulled tight in the transverse direction of roof 10. Strip infeed elements 30 make it possible for roller blind web 16 to be guided and centered even in the area of transverse frame part 26.

Bilaterally disposed strip infeed elements 30 each have an inner retaining rib 36, which is disposed closer to the vertical longitudinal center plane of roof 10, and an outer retaining rib 38, which is disposed further away from the vertical longitudinal center plane of roof 10, retaining ribs 36 and 38 retaining guide strip 34 in strip infeed element 30 and being adjacent to corresponding guide ribs 40 and 42 of guide track 32 of associated guide rail 24A or 24B.

On a side facing transverse frame part 26, strip infeed elements 30 each have a resilient element 64 which has a sinuous cross-section in the longitudinal direction of associated guide rail 24A or 24B in particular, i.e., is bent in opposite directions multiple times. With resilient elements 64, tolerances between strip infeed elements 30 and associated guide rail 24A or 24B can be compensated, tolerances in the longitudinal and vertical directions of the guide rails being compensated in particular.

On a side facing associated guide rail 24A or 24B, each strip infeed element 30 comprises two locking elements in the form of pins 52 and 54. Recesses 66 and 68 corresponding to pins 52 and 54 are formed on guide rails 24A and 24B by appropriate profile design. In an installed state, which is illustrated in FIGS. 13 and 14, pins 52 and 54 are each disposed in matching recesses 66 and 68 of respective guide rails 24A and 24B. In this way, guide rails 24A and 24B are precisely positioned in relation to strip infeed elements 30, i.e., a defined relative position is established.

Furthermore, strip infeed elements 30 each comprise two locking elements 56 and 58 which are realized as catch elements. Guide rails 24A and 24B each have a mating catch element 60 in the form of a recess and a mating catch element 62 in the form of a catch lug. With the aid of catch elements 56 and 58 and mating catch elements 60 and 62, guide rails 24A and 24B can be fixed to strip infeed elements 30.

REFERENCE SIGNS 10 vehicle roof
12 roof cutout
14 roller blind arrangement
16 roller blind web
18 winding shaft
20 roller blind fabric roll
22 pull bar
23 slider
24A, B guide rail
26 transverse frame part
28 bearing seat
30 strip infeed element
32 guide track
34 guide strip
36 inner retaining rib
38 outer retaining rib
40 guide rib
42 guide rib
44 support wall
46 body
48 tab-like protrusion
50 sealing element
52 pin
54 pin
56 catch element
58 catch element
60 mating catch element
62 mating catch element
64 resilient element
66 recess
68 recess

The invention claimed is:

1. A roller blind arrangement for a motor vehicle comprising:
   a roller blind web, which can be wound up to form a roller blind fabric roll in a winding area, and
   two guide rails which are disposed on either side of a longitudinal center plane of the roller blind web, and which comprise respective guide tracks in which lateral guide strips of the roller blind web are guided, the two guide rails being connected to each other via a transverse frame part in which the winding area for the roller blind web is formed,
   wherein each of the guide rails has an end adjacent to the transverse frame part, and
   the transverse frame part has a strip infeed element for each guard rail, the strip infeed elements forming infeed tracks for the guide strips, each infeed track being defined by at least one inner retaining rib, which is disposed closer to the longitudinal center plane, and at least one outer retaining rib, which is disposed further away from the longitudinal center plane, the retaining ribs serving to retain the guide strips, and the infeed tracks ending in the guide tracks of the guide rails;

wherein each strip infeed element is connected to a body of the transverse frame part via a support wall;

wherein the support walls are elastically deformable, so that tolerances between the transverse frame part and the two guide rails are compensated;

wherein the entire body of the transverse frame part and both strip infeed elements together form a one-piece injection-molded plastic part;

a winding shaft is provided onto which the roller blind fabric roll is formed and which is pivotely supported by the transverse frame part; and wherein the support walls are straight and protrude from the body of the transverse frame part in a direction of the respective guide rails, so that the respective strip infeed elements are spaced apart from the body of the transverse frame part.

2. The roller blind arrangement of claim 1, wherein the support walls have a maximum wall thickness of about 4 mm.

3. The roller blind arrangement of claim 1, wherein each strip infeed element has at least one locking element which engages into a respective one of the guide rails.

4. The roller blind arrangement of claim 1, wherein each strip infeed element comprises a locking element, and each of the two guard rails has a mating locking element for each locking element, the two guide rails and the strip infeed elements thus being each fixed to each other.

5. The roller blind arrangement of claim 1, wherein a sealing element is disposed between the end of each of the two guide rails and the transverse frame part.

6. The roller blind arrangement of claim 1, wherein the transverse frame part is an injection-molded plastic part made of glass-fiber-reinforced plastic.

7. The roller blind arrangement of claim 1, wherein the two guide rails are extruded aluminum profiles.

* * * * *